United States Patent [19]

Savitzky et al.

[11] Patent Number: 5,918,051
[45] Date of Patent: Jun. 29, 1999

[54] OBJECT-ORIENTED COMMUNICATION SYSTEM WITH SUPPORT FOR MULTIPLE REMOTE MACHINE TYPES

[75] Inventors: Stephen R. Savitzky, San Jose; Rithy K. Roth, Newark; Tina L. Jeng, Los Altos; Peter E. Hart, Menlo Park; Richard Golding, San Francisco, all of Calif.

[73] Assignee: Ricoh Company, Ltd., Menlo Park, Calif.

[21] Appl. No.: 08/504,192

[22] Filed: Jul. 19, 1995

[51] Int. Cl.⁶ ........................................................ G06F 9/00
[52] U.S. Cl. ........................................ 395/683; 395/200.49
[58] Field of Search ............................. 395/800, 683, 395/685, 200.47, 200.49

[56] References Cited

U.S. PATENT DOCUMENTS

| | | | |
|---|---|---|---|
| 4,407,016 | 9/1983 | Bayliss | 395/375 |
| 5,168,441 | 12/1992 | Onarheim | 364/146 |
| 5,297,279 | 3/1994 | Bannon et al. | 395/600 |
| 5,371,895 | 12/1994 | Bristol | 395/800 |
| 5,404,529 | 4/1995 | Chernikoff et al. | 395/700 |
| 5,421,009 | 5/1995 | Platt | 395/600 |
| 5,453,933 | 9/1995 | Wright | 364/474.23 |
| 5,457,797 | 10/1995 | Butterworth | 395/650 |
| 5,475,845 | 12/1995 | Orton et al. | 395/700 |
| 5,499,368 | 3/1996 | Tate et al. | 395/600 |
| 5,511,199 | 4/1996 | Anthias et al. | 395/700 |
| 5,548,723 | 8/1996 | Pettus | 395/200 |
| 5,568,639 | 10/1996 | Wilcox et al. | 395/600 |
| 5,583,983 | 12/1996 | Schmitter | 395/705 |
| 5,606,700 | 2/1997 | Anthias et al. | 395/683 |
| 5,832,264 | 11/1998 | Hart | 395/683 |

FOREIGN PATENT DOCUMENTS

WO 91/11766  1/1991  WIPO.
WO 95/17720  5/1994  WIPO.

OTHER PUBLICATIONS

Jacquot J. P., "Programming Through Disciplined Modification," in *Proceedings of the International Conference on Software Maintenance*, Victoria, BC, Canada, pp. 362–371, (Sep. 19–23, 1994).

Sparks Steve et al., "Managing Object–Oriented Framework Reuse," in *Computer,* vol. 29, No. 9, pp. 52–61, (Sep. 1996).

*Primary Examiner*—Eric Coleman
*Attorney, Agent, or Firm*—Townsend & Townsend & Crew, LLP

[57] ABSTRACT

An apparatus for communicating with a plurality of remote machines, of a plurality of machine types includes a computer system including a processor and memory a data communication means, coupled to the computer system and to the plurality of remote machines, for communicating with each of the plurality of remote machines, a first plurality of software objects within the memory for describing services for the plurality of remote machines, and a plurality of operations within the memory associated with the first plurality of software objects, the plurality of operations for satisfying requests described by the services of the first plurality of software objects.

39 Claims, 6 Drawing Sheets

OBJECT-ORIENTED COMMUNICATION SYSTEM WITH SUPPORT FOR MULTIPLE REMOTE MACHINE TYPES

COPYRIGHT NOTICE

A portion of the disclosure of this patent contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the area of service tools for remote machines. More specifically, the present invention relates to communication between service application programs in computer systems, and remote devices such as remote machines and external data in files, databases, and programs.

Object Oriented Programming

An understanding of object oriented programming and object-oriented application frameworks will assist in full understanding of the present invention. As is understood to one skilled in the art, an "object" is an abstraction of a real world entity and is implemented as a combination of a data structure (whose fields are called "attributes" or "data members") and a set of operations ("methods" or "member functions") that can be performed on it. A "class" is a data type for a set of objects that each have the same data structure and the same operations. An "instance" of a class is an object, the data type of which is the class, as actually embodied in the memory of a running application program.

Classes are grouped into one or more (compile-time) hierarchies based on "inheritance," which allows the interface (i.e. the names and types of the attributes and methods) of a "subclass" to be specified in terms of its differences from those of one or more "superclasses." Instances may be grouped in one or more (run-time) hierarchies by "containment"; an object that contains a plurality of other objects is called a "container" or a "collection." Further information regarding object oriented programming concepts are found in The Annotated C++ Reference Manual by Margaret A. Ellis and Bjarne Stroustrup, Addison Wesley c 1990.

An "object-oriented application framework" consists of a library of classes that are designed to be extended and subclassed by the application programmer, packaged along with several illustrative sample applications that use those classes and which are designed to be modified by the application programmer. The sample applications generally constitute a system that is useful in its own right. In general, the basic concept of a framework is well known to one skilled in the art. Some example frameworks include X Toolkit, Motif Toolkit, Smalltalk Model-View-Controller GUI, and MacApp.

Remote Service Application

An "application" is a program or set of cooperating programs that enable a user of a computer system to accomplish some task or set of tasks.

Remote Service Applications are applications that allow a computer user to communicate with and perform services (operations) upon machines (remote machines) that are separate from the user's computer system, possibly at a remote location, i.e. off-site. Some examples of remote machines include office machines such as copy machines, facsimile machines, and phone systems; and software entities in the memory of some remote computer system such as a file server or database server, etc. The typical actions performed with remote service applications include remotely diagnosing problems of a remote machine, monitoring the usage of the remote machine, enabling/disabling features of the remote machine, retrieving data, changing parameters, etc.

The present invention also supports applications that communicate with and perform operations upon software entities such as files and processes that are contained the same computer system as the application program; we will use the term "remote machine" with the understanding that it may also include processes and files in the user's machine, but external to the memory and process controlled by the remote service application program.

To access a remote machine, the remote service application uses a "device driver" associated with some interface device such as a modem, and a "protocol driver" that formats the data sent to and received from the remote machine. These drivers may be part of the operating system or may be modules within the application program.

In the past, remote service applications were individually customized for each type of remote machine. For example, a first remote service application communicated only with machines having a particular protocol, whereas a second remote service application communicated only with machines having a different protocol. An advantage of this customized approach is that the remote service applications are efficient because they are tightly coupled to the architecture and parameters of the respective remote machine.

One disadvantage to individually customized remote service applications is that each software system often includes functions and data that are commonly used and duplicated for each system, such as customer databases. Another disadvantage is that each time a new type of remote machine is manufactured, a new software system needs to be created to address the unique capabilities of the new type of remote machine. The problem with this is that the software system is often built from scratch; thus the development cycle time is high. Yet another disadvantage is that individually customized approaches are often inflexible. Typically once a software system is on-line, modifications to the software system are very difficult because of the numerous ramifications to other parts of the software system.

What is needed is a set of software mechanisms by which a remote service application can communicate with and operate on any one of a plurality of remote machines, and a method for developing these remote service applications, that avoid the disadvantages disclosed above.

SUMMARY OF THE INVENTION

The present invention relates generally to the area of service tools for remote machines. More specifically, the present invention relates to communication between service application programs in computer systems, and remote devices such as remote machines and external data in files, databases, and programs.

According to a preferred embodiment of the invention, an apparatus for communicating with a plurality of remote machines, of a plurality of machine types, includes a computer system including a processor and memory, a data communication means, coupled to the computer system and to the plurality of remote machines, for communicating with each of the plurality of remote machines, and a first plurality of software objects within the memory for describing services for the plurality of remote machines. A preferred embodiment also includes a plurality of operations within the memory associated with the first plurality of software objects, the plurality of operations for satisfying requests described by the services of the first plurality of software objects.

According to another embodiment of the invention, a system for communicating with a plurality of remote machines of a plurality of machine types includes a computer system including a memory and a mass storage device, a plurality of machine description files within the mass storage device, the plurality of machine description files for describing the plurality of remote machines, and a plurality of application programs within the memory, each of the plurality of application programs for reading representations of a plurality of software objects, and for making and satisfying requests described by services of the plurality of software objects.

DESCRIPTION OF A PREFERRED EMBODIMENT

Overview

Figure 1:
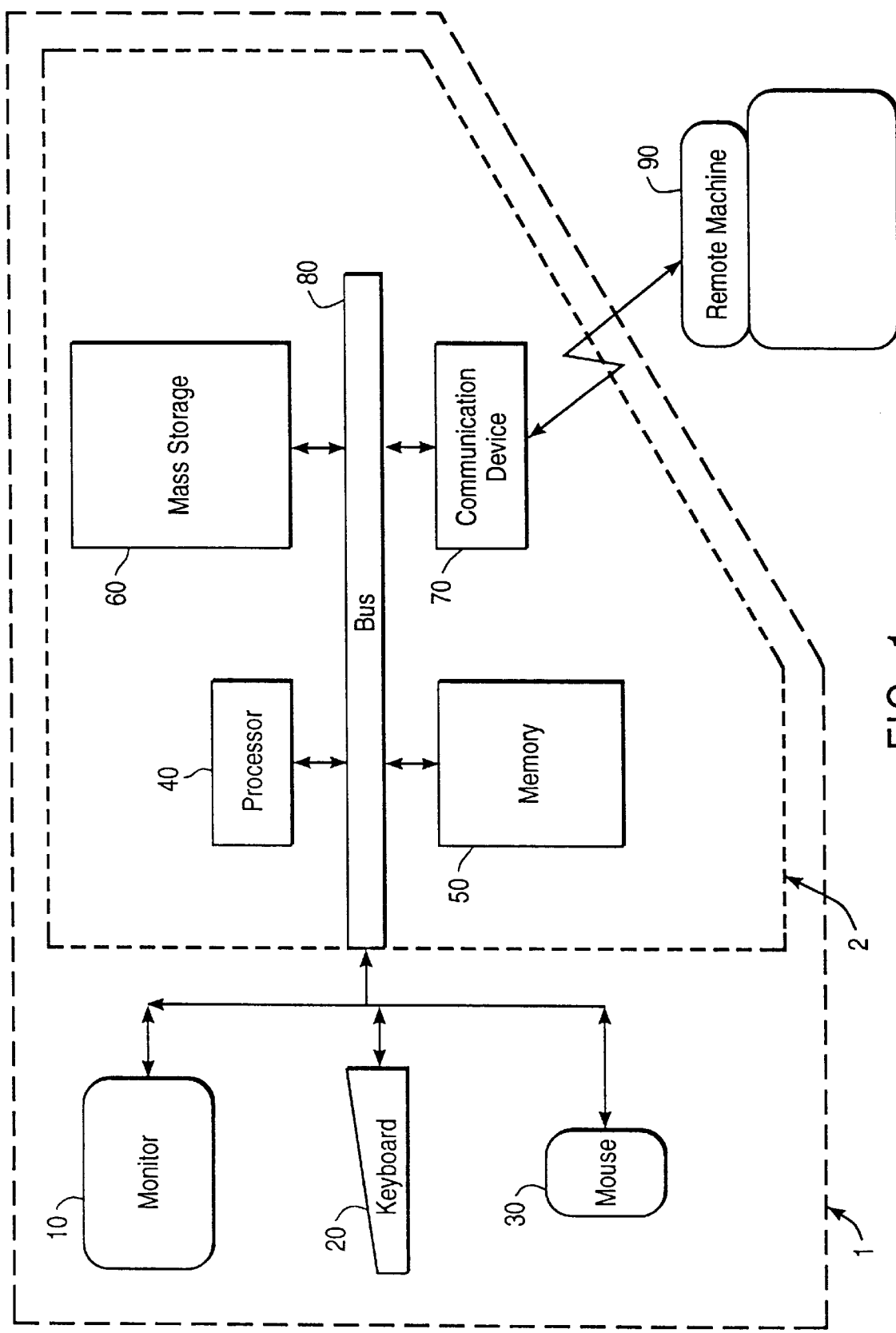
FIG. 1 is a block diagram of a system 110 according to a preferred embodiment of the present invention.

A preferred embodiment of the present invention is part of the REST ("Ricoh Electronic Service Tool") object-oriented application framework which is currently under development by Ricoh Corporation, the assignee. An object-oriented application framework ("framework") comprises a class library that includes the declarations and implementations of classes of objects, and a plurality of sample application programs written using those classes.

A framework is a system that enables an application programmer to quickly and easily write new application programs in some application domain, e.g. (in the case of the present invention) remote service applications. In particular, the application programmer typically edits sample application programs that have been written for a particular remote machine to create a new application program.

The object classes in the framework that are part of a preferred embodiment of the present invention, when instantiated as software objects within the memory of a computer system, constitute a mechanism and an associated method that enables any application program implemented using them to communicate with a plurality of remote machines, of a plurality of different types.

The sample applications also constitute a system in their own right, for performing some set of tasks, e.g. (in the case of the present invention) remote service tasks.

Definitions

A "component" is a software object that represents the services and state of some remote machine. A component may have sub-components, e.g. a copier may have a sorter and a feeder attached to it.

A "device" is a computer system peripheral that enables the computer system in which the remote service application is running to communicate with one or more remote machines.

A "device driver" is a software object that provides an interface by which the remote service application communicates with a device.

A "machine" is any hardware or software entity that is external to the computer system in which the remote service application is running; i.e. a remote office machine, file server, or database server.

A "machine model" is a collection object, the contents of which are "model item" objects, describing the services provided by some component.

A "model item" is an object that describes an individual service item provided by some remote machine.

A "service" is any operation that can be performed on or by a component, including retrieving or updating data contained in that component.

A "service item" is an abstract class that describes a service or set of services, or the data currently contained in a service.

A "machine state" is a collection object, the contents of which are "application item" objects.

An "application item" is an object that contains the information the remote service application has about some service provided by the remote machine, including the current state (data) of the service in the machine and any changes or operations that the end user of the program has requested and that have not been performed.

Naming Conventions

The following is a summary of the naming conventions used herein and in the attached software appendix. The names of classes are capitalized, with internal capital letters to indicate the start of words. Names of global functions, variables, and classes have a one- to three-letter prefix that indicates the general family to which they belong. For example, the data structure that describes a service item, and all of its subclasses, have a prefix of "SI__." Classes that descend from "R__Base" have the prefix separated from the rest of the name by an underscore; "R__Base" is the base class for objects that can be put into collections, written into external files, and read back from those files.

Classes and data types whose names lack an underscore are usually instantiated as variables, function arguments, or class data members, and are passed by value; classes whose names include an underscore are almost always instantiated on the heap and passed as references or pointers. This convention allows one skilled in the art of object-oriented programming to easily distinguish classes from instances, and instances from references or pointers to instances, in the discussion that follows.

The names of global functions, constants, and variables have a lowercase prefix.

Member functions and data members that are part of a class's public interface start with a lowercase letter. Protected data members have a name ending in underscore; there is usually a public member function to access the data; its name is the same but without the underscore. Such data members are called "attributes," and are declared using macros whose names start with "R__ATTR."

If there is a member function that updates a value, its name ends in "Set"; the update function is declared by the same macro that declares the attribute.

1. System Overview

FIG. 1 is a block diagram of a computer system 1 according to a preferred embodiment of the present invention. Computer system 1 includes a display monitor 10, a keyboard 20, and a mouse 30, and computer 2. Computer 2 includes a processor 40, a memory (e.g. semiconductor RAM) 50, a mass storage device (e.g. a disk drive) 60, and a communication device (e.g. a modem) 70, and a system bus 80 interconnecting the above components. Mouse 30 is but one example of a graphical input or pointing device. A remote machine 90 is typically coupled to system 1 via a communication device such as modem 70.

In a preferred embodiment, system 1 is a 80486 microprocessor class based machine, running Linux or Windows 3.1 operating system, the latter from Microsoft Corporation, and remote service application programs developed using the REST application framework currently under development by Ricoh Corporation. A preferred embodiment of classes of objects in the REST framework, described below, are written in C++.

FIG. 1 is representative of but one type of system for embodying the present invention. It will be readily apparent to one of ordinary skill in the art that many system types and configurations are suitable for use in conjunction with the present invention.

Framework Description

Figure 2:
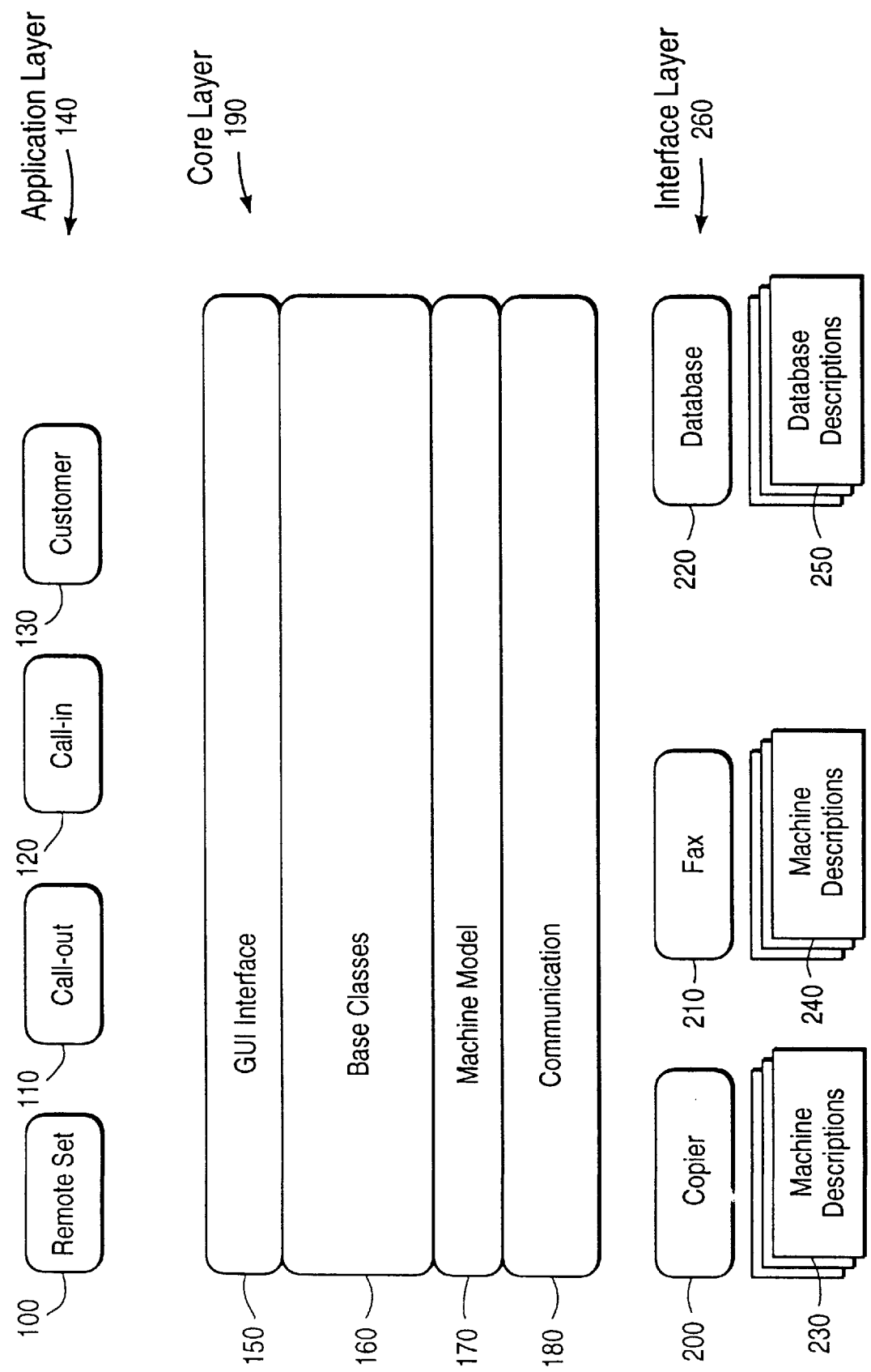
FIG. 2 illustrates a block diagram of an object-oriented application framework for use in a preferred embodiment of the present invention.

FIG. 2 illustrates a block diagram of an object-oriented application framework as used in a preferred embodiment of the present invention. The application layer 140 is the portion of the system consisting of application programs run by an end user, including Remote Setting 100 and Customer Database Access 130, and application programs run automatically by the operating system, including Call-out 110 and Call-in 120.

The core layer 190 consists of a library of class declarations and implementations that provide functions shared by all remote service applications residing in application layer 140 of the framework, including graphical user interface functions 150, general programming-system functions 160, modelling remote machines 170, and communicating with remote machines 180.

The interface layer 260 contains classes ("device drivers") that provide an interface to specific local communication devices such as modems, classes ("protocol drivers") that provide an interface to the communication protocols required to communicate with and operate upon specific families of remote machines (e.g. copiers 200 and facsimile machines 240), as well as interfaces to remote or local database servers 220, and files 230, 240, 250 ("machine description files") that contain descriptions of the services provided by specific types of remote machine. The application programming interface (API) of the classes in the interface layer 140 is defined by abstract classes in the core layer 190; hence an application programmer is insulated from the details of specific interface devices and remote machines.

An application programmer using the framework implements remote service application programs, typically by using a text editor to copy and modify one or more of the existing sample programs in the application layer 140. Applications constructed in this way share a common, well-proven architecture and design, and a large body of re-usable code; eliminating most of the design and debugging phase from the software life-cycle is one way in which the use of an object-oriented application framework speeds up the implementation of remote service applications.

A program that uses the present invention to communicate with a remote machine is capable of communicating with almost any remote machine.

Sample Application Program and File Description

Figure 3:
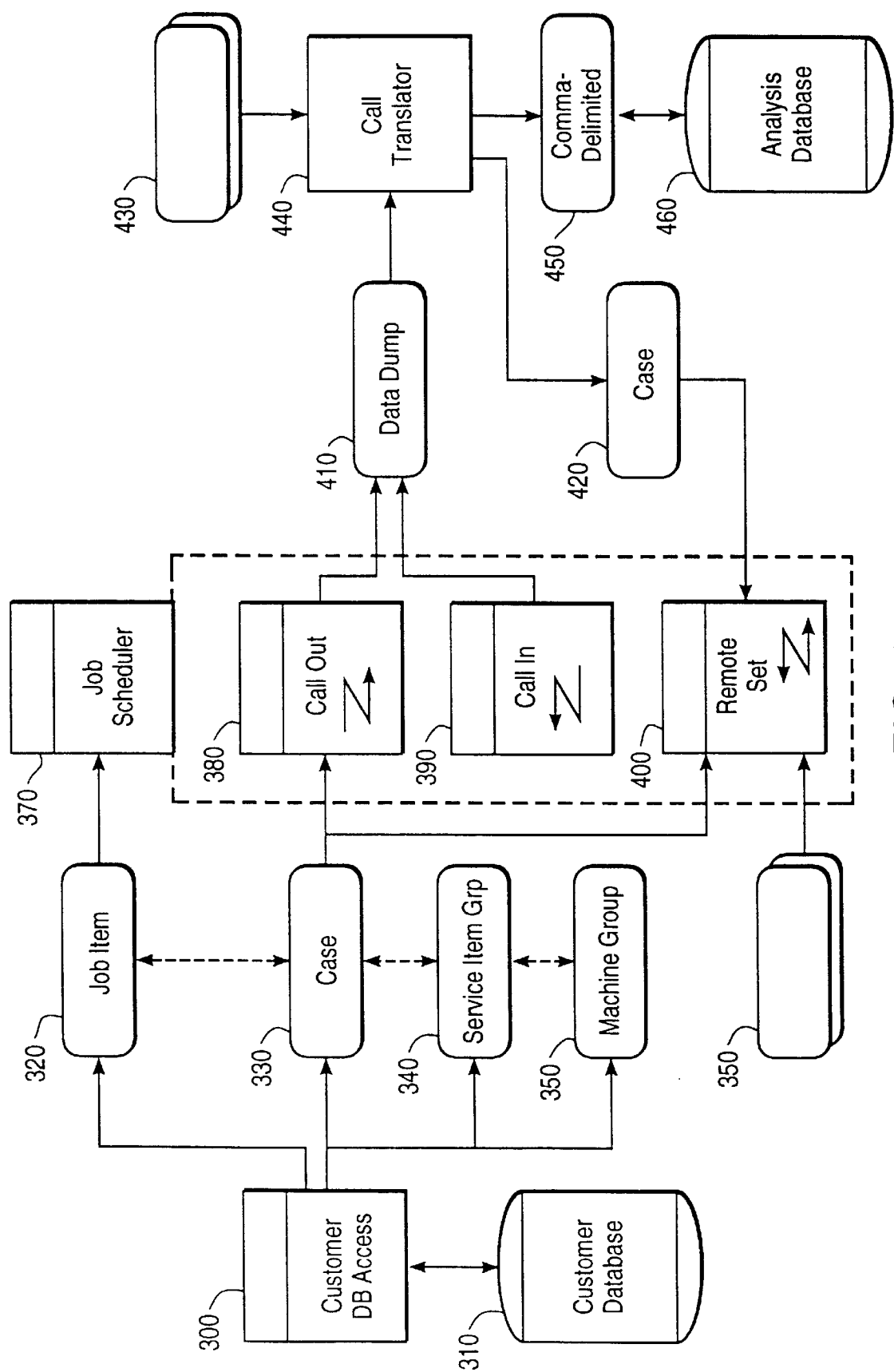
FIG. 3 illustrates a block diagram of the sample remote service application programs and data files supplied with the framework for use in a preferred embodiment of the present invention.

FIG. 3 illustrates some of the sample application programs in application layer 140 of the framework (FIG. 2) and the files whereby they communicate information. All application programs and files preferably reside in the Mass Storage Device 60 of the Computer System 1.

The user interacts directly with a Customer Database Access application 300, a Job Scheduler application 370, and a Remote Setting application 400. (It will be clear to one skilled in the art that many other interactive programs are possible; these are merely illustrative examples.)

The Customer Database Access application 300 allows the user to query a customer database 310 to select machines with which to communicate; it also allows the user to select groups of machines (each described in a Machine Group file 350) and groups of service items (each described in a Service Item Group file 340) upon which to operate. The Customer Database Access application 300 outputs a Job Item file 320 and a Case file 330, each containing the filenames of the other files involved in the interaction.

The user then runs the Job Scheduler application 370, which reads Job Item files 320 and automatically runs instances of the Call Out application 380 and Remote Setting application 400 in order to communicate with one or more Remote Machines 90. The Call In application 390 may be run at any time in response to an incoming communication from a remote machine 90.

The Call In application 390 and Call Out application 380 write a Data Dump file 410 which contains a copy of the information sent by a remote machine 90 to the Call In application or retrieved from a remote machine 90 by the Call Out application 380. The Data Dump file 410 is translated by the Call Translator application 440 into either a Case file 420 or a Comma-Delimited file 450 for import into an Analysis Database 460 or other application program such as a spreadsheet. The Call Translator application 440 performs its conversion operation using a description of the remote machine 90 contained in one of a plurality of Machine Model files 430.

The Remote Setting application 400 is used for direct interactions between a user and some remote machine 90; the operations that can be performed on the remote machine 90 are described in one of a plurality of Machine Model files 350; the access information (e.g. telephone number) of the remote machine 90 and some of the operations to be performed on it may be specified in a Case file 330, or entered directly by the user.

2. Machine Model Module

2.1. Overview

The Machine Model module 170 in FIG. 2 is the main module within the Core Layer 190. The objective of the machine model module is to describe the services available on remote machines to remote service applications in the form of configurations of objects, called Machine Models, and to contain and organize the information required for the application program to keep track of the current state of the remote machine and of any operations and data transfers requested by the user.

In a preferred embodiment of the present invention, the machine and service class hierarchies consist of the following (note indentation denotes inheritance):

| | |
|---|---|
| Component | Describes a remote machine |
| Service | |
|   ServiceCollection | Collection of service items |
|     SC_ServiceModel | A Component's model |
|     SC_AppServices | A Component's application items |
|     SC_Queue | A collection of SI_QueueItems |
|     (and other various other special-purpose collections) | |
|   SI_ServiceItem | Describes a remote service |
|     SI_ModelItem | machine model---description only |
|     SI_GuiItem | a GUI element representing an item |
|     SI_AppItem | application state for an item |

| SI_QueueItem | a queued read or write on an item |

2.2. Component and Associated Objects

Figure 4:
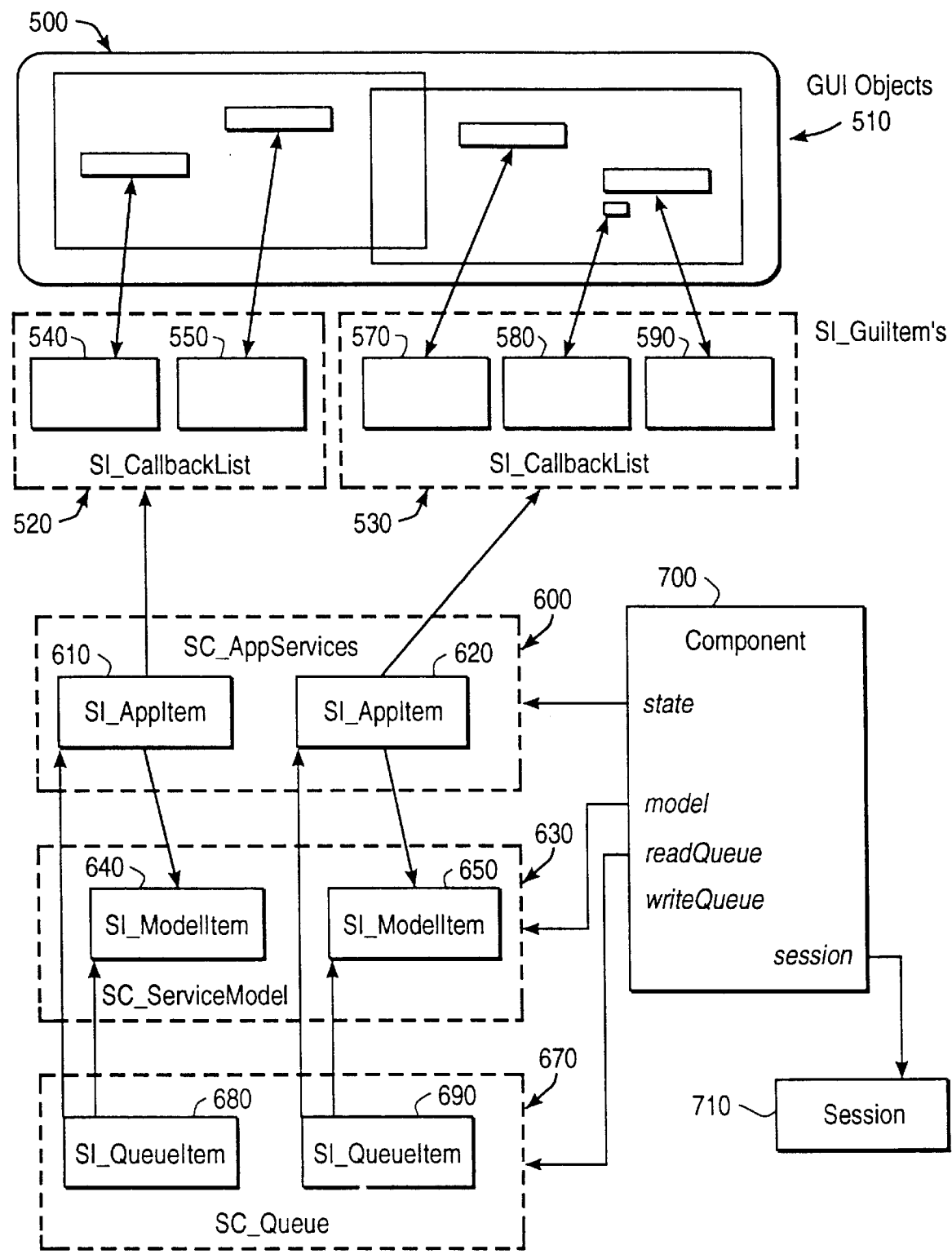
FIG. 4 illustrates the representation, in a preferred embodiment of the present invention, of the component, graphical user interface, application state, machine model, and queue objects that describe a remote machine.

FIG. 4 illustrates a typical Component 700 (object instance in the memory 50 of computer system 1 representing a remote machine 90) and the objects to which it refers. These objects are its "state" attribute 600, an SC_AppServices object, its "model" attribute 630, an SC_ServiceModel object, its writeQueue and readQueue attributes 670, each an SC_Queue object, and its "session" attribute 710, a reference to an instance of a subclass of class SI_CommunicationSession.

An SC_ServiceModel 630 is a collection of "model items" 640, 650, each model item being an instance of a subclass of SI_ModelItem. Collectively the SC_ServiceModel 630 is a description of the services provided by the remote machine 90 represented by Component 700.

An SC_AppServices 600 is a collection of "application items" 610, 620, each application item being an instance of class SI_AppItem, and having a reference to a corresponding SI_ModelItem 640, 650 and SI_CallbackList 520, 530. Each application item 610, 620 contains information about the current value (if known) of the corresponding service in the remote machine, and any requested operations or data transfers involving that service. The SC_AppServices object 600 is initialized by means of the "initServices" operation on class Collection 700; one of its parameters is an optional pointer to a function from pointer-to-SI_ModelItem to Boolean that allows an application to select from the machine model 630 only those services that are actually used by the application.

An SI_CallbackList 520, 530 is a collection of SI_GuiItem objects 540, 550, 570, 580, 590, each of which refers to and is referred to by a single object that represents a "control" in the graphical user interface which displays information and with which the user may interact. The purpose of the SI_GuiItem is to ensure that changes made by the user using the graphical user interface cause equivalent changes in the appropriate SI_AppItem 610, 620 in the application state 600, and that changes in an SI_AppItem 610, 620 in the application state 600 that result from the operation of the program, and particularly from communication with the remote machine, cause equivalent changes in the information presented to the user by the graphical user interface.

The operation "newValueSet" of class SI_AppItem is used to request a change of state (write operation) in the service. The operation "readRequest" of class SI_AppItem is used to request a read operation. When a read or write operation is requested, an object 680, 690 of class SI_QueueItem is constructed that refers to the SI_AppItem 610, 620 and also contains the requested operations: read or write and, in the case of a write, the data to be written. The SI_QueueItem is placed on either a read queue 670 or a write queue that are attached to Component 700. These queue items accumulate until the user or the application requests a batch communication session with the remote machine, as will be further described in conjunction with the communications module.

When the batch communication session is performed, the currentValue attribute of each SI_AppItem is updated to reflect the value stored in or retrieved from the remote machine. Each SI_GuiItem 500 associated with SI_AppItems 610, 620 is automatically notified of the update as a side effect of the "currentValueSet" operation.

A Component object is itself a container for "subcomponents" (not shown), corresponding to separately-controllable machines connected to the remote machine. For example, the top-level Component object 700 may be a line-adapter multiplexer, to which a plurality of copiers are attached, represented by the contents of the top-level Component 700.

Figure 5:
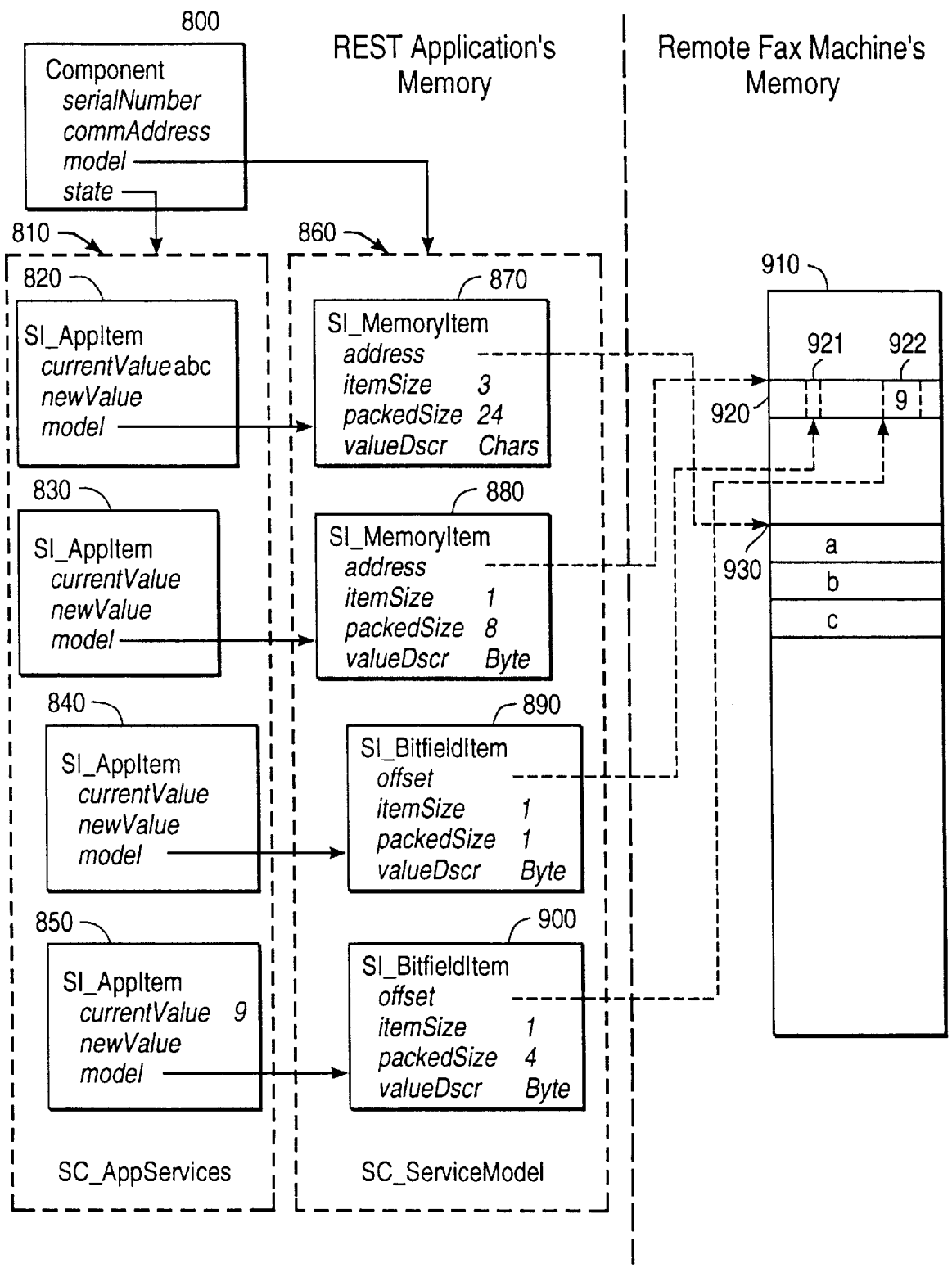
FIG. 5 illustrates the representation, in a preferred embodiment of the present invention, of a remote facsimile machine and the corresponding component, machine model, and application state objects, and their relationship to the data contained in the remote machine.

FIG. 5 illustrates the relationship between the machine model 860 (630 in FIG. 4), the application state 810 (600 in FIG. 4), and the remote machine 90. For this illustration we will use a facsimile machine similar to the Ricoh model FAX-60, in which the remotely-accessible services are represented by data contained in an electronically-erasable read-only memory 910, from which data may be retrieved or in which data may be modified by presenting the facsimile machine 90 with a suitably-formatted request containing a starting address and size. It can easily be seen by one skilled in the art that other protocols are possible, involving different ways of identifying the data to be transferred, and different encodings for the data.

Since the remote facsimile machine stores service items in a memory, the machine model 860 contains objects 870, 880 that are instances of class SI_MemoryItem, a subclass of SI_RemoteItem which in turn is a subclass of SI_ServiceItem. For example, SI_MemoryItem 870 has a size 3 in its "itemSize" attribute, specifying a string of length 3. The data type "Chars" in SI_MemoryItem 870 is represented in the "valueDscr" attribute by a pointer to an instance of a subclass of class R_ValueDscr.

Some of the remotely-accessible data consists of bitfields stored within bytes in the memory; FIG. 5 illustrates two such bitfields 921, 922 contained within a byte 920 in memory 910 of remote facsimile machine 90, each represented by an instance 890, 900 of class SI_BitfieldItem, both contained within the SI_MemoryItem object 880 that represents the byte 920.

Each service item that can be manipulated by the remote service application program has a current state within the application state 810 represented by an instance 820, 830, 840, 850 of class SI_AppItem.

In a preferred embodiment of the present invention, the machine model is composed of instances of subclasses of SI_ModelItem, having the following hierarchy (note indentation denotes inheritance):

| | |
|---|---|
| SI_ModelItem | machine model---description only |
|   SI_InternalItem | internal to application |
|   SI_ExternalItem | external storage or server |
|     SI_DirectoryItem | directory |
|     SI FileItem | file |
|     SI_TableItem | database table |
|       SI_QueryItem | database query |
|     SI_TupleItem | database tuple |
|     SI_FieldItem | database field |
|   SI_RemoteItem | remote machine |
|     SI_MemoryItem | stored in remote memory |
|       SI_BitfieldItem | bitfield in word |
|     SI_ProgramItem | accessed by remote program |

The abstract class SI_ModelItem provides an abstract programming interface for performing access and update operations to a service item located on a remote machine; the various subclasses of SI_ModelItem provide implementations of these operations for operating on particular kinds of remote data using communication protocols specific to particular remote machines.

The subclassing allows SI_MemoryItem objects 870, 880 to have behavior specific to remote service items stored in a remote machine's memory, and SI_BitfieldItem objects 890, 900 to have behavior specific to bitfields that are contained in a word stored in a remote machine's memory. For example, the "packedSize" attribute is computed by a function that in an SI_BitfieldItem simply returns the value of the "itemSize" attribute, but in an SI_MemoryItem returns the value of the "itemSize" attribute multiplied by 8, the number of bits in a byte.

SI_InternalItem and SI_ExternalItem are the two main subclasses of SI_ModelItem. SI_InternalItem objects describe data associated with the remote machine, but internal to the remote service application (for example, the machine's serial number, which may not be accessible remotely but which may be obtained from a customer database). When data is external to the remote service application a subclass of SI_ExternalItem subclass is used. For example, SI_TableItem describes a table in a remote database server, and SI_MemoryItem describes a data item in the memory of a remote facsimile machine.

The data itself, i.e. its data type (integer, cardinal number, float, string, etc.), size, range of values, and other attributes, are described in a data structure called a "value descriptor" (class R_ValueDscr). These value descriptors are runtime class descriptors similar to those used in languages such as Smalltalk. A pointer to the value descriptor and the default value of the data are combined in an object of class Rvalue, which is the "defaultvalue" attribute of the SI_ModelItem object. Some attributes of the value descriptor may be overridden by corresponding attributes of the SI_ModelItem. If a value is a reference to an instance of some object, its class name and publicly-accessible attributes are described by an instance of class R_ClassDscr which is returned by the virtual function "dscr" of the object instance.

Each SI_AppItem object 820, 830, 840, 850 in the application state 810 stores the information that the remote service application has about the current state of the remote machine, the state of the user interface, and the relationship between them. Each instance of class SI_AppItem 820, 830, 840, 850 has an attribute "model" containing a reference to a single instance of class SI_ModelItem 870, 889, 890, 900 that describes the permissible states for that item, and its location or access information on the remote machine. Each SI_AppItem also has an attribute "currentValue," that contains information about the current state of that service item in the remote machine, as well as an attribute, "newValue," that represents a requested update state for the remote item.

Compound Data

When a service item in the remote machine consists of a compound data structure such as an array or structure, it is described by an SI_ModelItem object having a collection of one or more subsidiary SI_ModelItem objects, also known as its "children." An SI_ModelItem representing an array will have a single child describing the array item objects and an SI_ModelItem representing a structure will have a separate child describing each field. The corresponding SI_AppItem may have either a child SI_AppItem for each sub-item (array element of structure field), or else a single compound value that refers to an array of sub-item values. Each SI_AppItem representing an array element has a value in its "location" attribute that is an index from the start of the array. The application programmer decides which of these two representations is most appropriate for any given application. For example, in FIG. 5, remote data byte 920, described by SI_AppItem object 830 and SI_MemoryItem object 880 contains bitfields that are described by SI_AppItem objects 840 and 850 and SI_Bitfield objects 890 and 900.

Remote Machine History

Optionally, the history of a remote machine may be stored in a historical database (not illustrated). Types of historical data include for example, the number of copies made on a copier every month, the options purchased by the customer, etc. To track the history, the SI_AppItem has an attribute, "history," that points to another SI_AppItem of a different component. The different component is typically one that describes a database or file.

The history item's "currentvalue" reflects what is known about the item when the application is started (e.g. The previous month's copy count in a billing application). When there is a change in what the system knows about the item, "currentValueSet" is called to reflect the change and the history item's "newValueSet" operation is called with the same value. In some applications (e.g. remote setup) it may be very useful to be able to revert a service item's value to the value it had when the program was started, so as to effectively undo any changes that may have been made by the application's user.

Defining New Model Items

As can be seen, the application programmer may readily define new subclasses to the class SI_ModelItem in order to describe new sorts of service items provided by any new remote machine, database, or other external resource. Any application linked with a library containing the code for such a subclass will be able to make use of the new service items at runtime; such applications need not be recompiled, but only relinked. By putting the new classes in a dynamic link library (DLL), suitably-constructed applications can make use of new service items even after being linked and distributed to users.

Initialization

It can be seen by one skilled in the art that the application program must construct in its memory a Component and its associated machine model and application state, in order to communicate with some remote machine.

In a preferred embodiment of the present invention, this can be done by parsing one or more files that contain a textual or binary representation of the object instances to be constructed, including the names of their classes, the names and values of their attributes, and the textual or binary representations of the objects contained in each collection object. The resulting parse tree is created using the constructors for the various classes represented in the file; its root is the required Component object instance 700, 800; its "model" attribute contains the machine model 630, 860, and its "state" attribute contains the application state 600, 810. The application state may either be constructed by parsing a separate Case file 330, 420, or constructed and initialized with default values from the machine model file 350, 430.

As an example, if the application program needs to communicate with a facsimile machine, the application program first retrieves a machine model file describing the facsimile machine. Such a file may appear as follows (partial):

```
SC_ServiceModel: ({
    name=k50
    {
    SI_MemoryItem: ({
        name=R17D4
        defaultValue=BCD1:51
        description='drmk50.dat#R17D4'
        itemValueList=[]
        features=S_FeatureSet: (SYSTEM
            RemoteSetting)
        readOnly=-
        msbFirst=+
        isremote=+
        bitOffset=0
        offset=6100
        label='NCU 13'
        })
    SI_MemoryItem: ({
```

```
            name=R17D5
            defaultValue=BCD1:256
            description='drmk50.dat#R17D5'
            itemValueList=[]
                features=S_FeatureSet: (SYSTEM
                RemoteSetting)
            readOnly=-
            msbFirst=+
            isremote=+
            bitOffset=0
            offset=6101
            label='NCU 14'
            |)
        SI_MemoryItem: (|
            name=R17D6
            defaultValue=BCD1:256
            description='drmk50.dat#R17D6'
            itemValueList=[]
            features=S_FeatureSet: (
                SYSTEM
                RemoteSetting)
            readOnly=-
            msbFirst=+
            isremote=+
            bitOffset=0
            offset=6102
            label='NCU 15'
            . . .
```

As illustrated, the description file a textual representation of a SC_ServiceModel (model) for a "K50" facsimile machine. Instances of SI_MemoryItem are described including R17D4, R17D5, and R17D6. Virtual functions within the appropriate instances are executed to handle the specific communication protocol.

As another example, if the application program needs to communicate with a copier machine, the application program first retrieves a file describing the Copier machine. Such a file may appear as follows (partial):

```
        SC_ServiceModel: (|
            name=FT8780
            |
            SI_CopierItem: (|
                name=LampThermistor
                writeDCode='1302;'
                features=S_FeatureSet: (
                    ReadOnly
                    RemoteSetting)
                msbFirst=-
                writeInfCode='16040070101'
                isremote=+
                offset=0
    label=LampThermistor
    separator=';'
                IDCode=[]
                defaultValue=Nchars2:"00"
                size_for_specify_data_length=2
                description=[]
                    readOnly=-
                bitOffset=0
                readInfCode='16040070101'
                size=2
                readDcode='1302;'
                |)
            SI_CopierItem: (|
                name=SC_ChargerLeak
                writeDCode='1302;'
                features=S_FeatureSet: (
                    RemoteSetting
                    ScCall)
                msbFirst=-
                writeInfCode='32000930201'
                isremote=+
                offset=0
                label=SC_ChargerLeak
                separator=';'
                IDCode=[]
                defaultValue=Nchars1_1:"0"
                size_for_specify_data_length=2
                description=[]
                readOnly=-
                bitOffset=0
                readInfCode='32000930201'
                size=1
                readDcode='1302;'
                |)
            SI_CopierItem: (|
                name=FusingTempADJ
                writeDCode='1304;'
                features=S_FeatureSet: (
                    ReadWrite
                    RemoteSetting)
                msbFirst=-
                writeInfCode='51011050101'
                isremote=+
                offset=0
                label=FusingTempADJ
                separator=';'
                IDCode=[]
                defaultValue=Nchars3s_16:"+00"
                size_for_specify_data_length=2
                description=[]
                readOnly=-
                bitOffset=0
                readInfCode='51011050101'
                size=1
                readDcode='1302;'
                |)
            . . .
```

As illustrated, the description file contains a textual representation of a SC_ServiceModel (model) for a "FT8780" copier machine. Instances of SI_CopierItem are described including LampThermistor, SC_ChargerLeak, and FusingTempADJ.

An application can communicate with a plurality of remote machines by creating a plurality of Component objects 700, 800 and associated machine models 630, 860 and application states 600, 810 in its memory, either sequentially or concurrently.

2.3. Exemplary Class Descriptors

The following C++ code consists of class declarations for an illustrative subset of a preferred embodiment of the machine model classes.

2.3.1. Service Class

The Service class is the general abstract base class for service items and service collections.

```
class Service: public R_Nameable {
    Description:
        R_ABSTRACT(Service, R_Nameable);
    public:
        Pseudo-Attributes:
        R_FUNC_RX(Service *, parent);
        R_CONTAINER_IS(parent);
            The parent of this service in the
            tree. Null if this Service is at the
            root of the Service tree (i.e. its
            parent is a Component). "parent" can
            either be set when the Service is
            created, or by the parent itself when
            the child is appended to it.
        R_FUNC_RO_RC(R_Collection, children);
```

```
        R_CONTENTS_IS(children);
            A collection to hold the children of
            this service. It is put here so that
            it can be initialized and deleted in
            one place. The downside of this is
            that downcasting has to be done in
            the subclasses in order to
            specialize.
        virtual void            setValueAt(Rcard i, Rvalue const &nv);
        virtual void            setValueOf(RKey const &key, Rvalue
                                    const & nv);
        virtual void            append(Rvalue const &nv);
                                    Override the operations that add
                                    children, so they can call parentSet.
        virtual Service         *getChildByName(R_Symbol *nm);
                                    Given a service name, find a child
                                    that matches it. Should be
                                    overridden in subclasses that can do
                                    fast lookup.
        virtual Component       *component() const;
                                    The component to which this service
                                    is attached, if any. Declaration of
                                    the contents is deferred until it can
                                    be strongly typed. This is done with
                                    "S_TYPED_CHILDREN(child_type,
                                    collection_type)"
        #define S_TYPED_CHILDREN(childType, collectionType)
        R_CONTENTS_INIT_NEW(collectionType, children);
        R_CHILDREN_ARE TYPED(childType, collectionType,
    parentset)
        Constructors:
            Service(R_Symbol &nm, Service *prnt = 0);
                By convention, all ServiceItem
                constructors take a reference to a name as
                their first argument, and an optional
                pointer to a parent as their last
                argument.
            Usage:
                "parent.append(new Service(name, &parent))"
            Service(R_Base const &o);
                When constructing a service using its
                copy constructor, we are typically
                building a tree from the bottom up
                and so do not know the parent. It
                has to get assigned on append, which
                we do with parentSet.
        Destructor:
            ~Service();
                Delegated Collection Operations:
                operations that append a service to a
                parent service have to set the
                child's "parent" field if necessary.
```

2.3.2. SI_ServiceItem Class

The SI_ServiceItem class provides a uniform interface for all service items.

```
        class SI_ServiceItem: public Service {
        Public:
            S_TYPED_CHILDREN(SI_ServiceItem,
        RT_Table<SI_ServiceItem>);
                    Returns information about this
                    service item: This information
                    is used to describe this service
                    item to the application
                    (features) and to the user
                    (label, description).
            R_ATTR_XX_RC(R_String, label);
                    A string used to display label this
                    ServiceItem for presentation to the
                    user. It the default name and may be
                    different from the name because of
                    application-specific renaming or
                    language translation.
            R_FUNC_GET(R_String *, description);
                    A string that gives a brief
                    description of what this
                    ServiceItem does. In general,
                    the description will be looked
                    up in a database or file rather
                    than being stored in the
                    application's working memory
                    before it is needed.
            R_FUNC_GET(S_FeatureSet*, features);
                    Returns a set of symbolic features
                    for this service.
            R_FUNC_GET(Rcard, offset);
                    Returns the address of this item (in
                    bytes) relative to its parent.
            R_FUNC_GET(Rcard, bitOffset);
                    Returns the offset in bits of this
                    item relative to the low order bit of
                    the item that contains it, if any.
            R_FUNC_GET(Rcard, index);
                    The index of this item in its parent,
                    if the parent is an array of
                    identical items. Zero otherwise.
            R_FUNC_GET(Rcard, address);
                    The absolute address of the item (in
                    bytes) relative to the start of the
                    memory, file, or whatever that
                    normally contains it. Computed from
                    offset, index, and size.
```

Value Description Information

The following functions are normally delegated to a descriptor, specifically the value descriptor of defaultValue. A few functions such as the sizes and valueList, can be overridden by attributes in SI_ModelItem.

```
            R_FUNC_GET(Rvalue, defaultValue);
                    The item's default value, if any. The
                    default value's R_ValueDscr is the
                    descriptor used for all instances of
                    this item.
            R_FUNC_GET(R_ValueDscr&, defaultDscr);
                    The default value descriptor. Should
                    be identical to
                    "defaultValue().dscr()," but deferred
                    for efficiency (i.e. so the user does
                    not wind up passing the whole value
                    around through several levels of
                    indirection).
            R_FUNC_GET(Rcard, minSize);
            R_FUNC_GET(Rcard, maxSize);
                    The minimum and maximum number of
                    bytes required to hold an item's
                    value, i.e., to store the item in the
                    remote machine's memory, to transmit
                    it to the machine, or to store it in
                    a database.
                    A maxSize of Rinvalidindex indicates
                    a variable-length object with no
                    upper bound on its size.
            R_FUNC_GET(Rcard, packedSize);
                    The number of bits required to hold
                    the item's value.
            R_FUNC_GET(Rcard, minWidth);
            R_FUNC_GET(Rcard, maxWidth);
            R_FUNC_GET(Rcard, minHeight);
            R_FUNC_GET(Rcard, maxHeight);
                    The minimum and maximum number of
                    characters and lines required to
                    represent a value as a string for
                    printing or display.
            R_FUNC_GET(Rvalue, minValue);
            R_FUNC_GET(Rvalue, maxValue);
                    The item's minimum and maximum
                    values. Return Rnullvalue for
                    string-valued items.
            R_FUNC_GET(Rvalue, unit);
```

```
            R_FUNC_GET(Rvalue, scaleFactor);
                A unit and scale factor to be
                displayed after the item's value.
                For example, a voltage's unit and
                scale factor might be V and 1000 for
                a value expressed in kilovolts.
            R_FUNC_GET(RBase *, valueList);
                The permissible values for an item
                with a small set of named values. It
                should be a collection indexed by
                numeric value and keyed by symbolic
                name.
            R_FUNC_GET(Rbool, msbFirst);
                Byte ordering.
            R_FUNC_GET(Rbool, readOnly);
                True if the item cannot be modified
                on the remote machine.
```

2.3.3. SI_ModelItem Class

A ModelItem is part of a machine's description, i.e., the program's model of the machine. It contains no information whatever about the current state of the machine, only how to get that state and what values are permissible. Essentially, a ModelItem contains everything that can be known in advance about an item without actually calling up a remote machine or looking in a database.

```
        class SI_ModelItem: public SI_ServiceItem {
            R_ABSTRACT(SI_ModelItem, SI_ServiceItem);
        public:
            R_String *descriptionInit();
                Initialize the description.
            R_ATTR_RW_RC(S_FeatureSet, features);
                The features of this item.
            R_ATTR_RO(Rcard, offset);
                The address of this item relative to
                the start of machine memory or the
                file or protocol buffer that normally
                contains it.
            R_ATTR_RO(Rcard, bitOffset);
                The offset in bits of this item
                relative to the low order bit of the
                item that contains it, if any.
            Value Description Information:
                Most value descriptor attributes are
                delegated one more level to a
                ValueDescriptor; some can be
                overridden here if necessary.
            R_ATTR_RO(Rvalue, defaultValue);
                The item's default value, if any.
                The default value's descriptor is the
                descriptor used for all instances of
                this item.
            R_FUNC_GET(R_ValueDscr&, defaultDscr);
                The descriptor of the default value.
            R_ATTR_RW(RBool, msbFirst); Byte ordering.
            R_ATTR_RW_RC(R_Base, itemValueList);
            R_FUNC_GET(R_Base *, valueList);
                A local value list that can override
                the one in the descriptor.
            R_ATTR_RW(Rcard, itemSize);
                A local override for size; either in
                bits or bytes depending on whether
                the item is a bitfield or a string.
            R_FUNC_GET(RCard, minSize);
            R_FUNC_GET(RCard, maxSize);
            R_FUNC_GET(RCard, packedSize);
```

Reading and Writing

SI_RemoteItem contains operations for reading and writing the item on a remote machine, however these are overridden in the protocol-specific subclasses. These operations are incorporated to SI_ModelItem because this is the class an SI_AppItem refers to. There is no reason why SI_AppItem should have to treat remote items and database items differently—for example, some machines may be able to report their own serial numbers, while others may have serial numbers only on the nameplate and in the customer database.

Note that the remote access operations take an SI_AppItem argument; this is the application item on behalf of which the work is being done. All operations return immediately, if the SI_AppItem is marked "busy" a callback method is invoked when the work is actually done.

```
            R_FUNC_GET_IS(RBool, readOnly, rFalse);
            R_FUNC_GET_IS(RBool, isRemote, rFalse);
                true if the service is actually
                contained on a remote machine. This
                can be used as a hint to warn the
                user that performing the read or
                write may take some time.
            virtual RBool updateParentNewValue(SI_AppItem *,
            RValue const &);
                Update the appItem's parent's
                newValue if necessary
            virtual RBool updateChildrenNewValue(SI_AppItem *,
            RValue const &);
                Update the appItem's childrens'
                newValue if necessary
            virtual RBool updateParentCurrentValue(SI_AppItem *,
            RValue const &);
                Update the appItem's parent's
                currentValue if necessary
            virtual RBool updateChildrenCurrentValue(SI_AppItem
            *, RValue const &);
                Update the appItem's chiidrens'
                currentValue if necessary
            virtual void readOrEnqueue(SI_AppItem *app, RBool
            mayQueue);
            virtual void writeOrEnqueue   (SI_AppItem *app,
                                RValue const &v, RBool
                                mayQueue);
                read or write the AppItem's current
                value. If isRemote() and mayQueue are
                both true, the operation will
                actually be queued.
            virtual void readNotify   (SI_AppItem *app, RValue
                                const &V1 R_Symbol
                                *status);
            virtual void writeNotify   (SI_AppItem *app, RValue
                                const &v, R_Symbol
                                *status);
                Notify the application item that a
                value has been read or written, with
                the appropriate status (null means
                that all went well). This is what
                actually stores the value in the
                AppItem.
            virtual void readEnqueue(SI_AppItem *app);
            virtual void writeEnqueue(SI_AppItem *app, RValue
            const &v);
                Make a queue entry.
            virtual void readValue(SI_AppItem *app);
            virtual void writeValue(SI_AppItem *app, RValue
            const &v);
                Actually perform the read or write,
                and notify the AppItem accordingly.
                May be called from a queue entry.
                The default is for readValue to
                return the ModelItem's defaultValue,
                and for writeValue to notify the
                AppItem that the value has been
                written.
            virtual RCard readValueFromBuffer   (SI_AppItem *app,
                                R_Buffer const
                                &buf, RCard
                                buf_addr = 0,
                                Rcard hdr_size =
                                0);
            virtual Rcard writeValueIntoBuffer (SI_AppItem *app,
                                RValue const &v,
                                R_Buffer &buf,
```

-continued

```
            Rcard buf_addr =
            0, Rcard hdr_size
              = 0);
    Perform the read or write on a
    buffer, and notify the AppItem.
       The buf_addr parameter is the
       starting address of the {[e]m
       buffer} relative to the
       machine's memory location zero;
       hdr_size is the location in the
       buffer corresponding to
       buf_addr, less any protocol
       header information.
Initialization:
    virtual void initAppItem(class SI_AppItem *,
    RValue&) {};
       Called when an SI_AppItem is created,
       in case the AppItem's current value
       needs to be initialized. The routine
       is given direct access to the current
       value.
```

2.3.4. SI_RemoteItem Class

SI_RemoteItem is the parent class for those service items actually performed by, stored in, or retrieved from a remote machine. This class represents the actual memory location for a memory-based service item, this class also contains information about individual bits, if necessary. If a remote machine has contents, this class gives individual names and descriptions to the components in the form of a data structure. Arrays of identical items have only one component.

```
class SI_RemoteItem: public SI_ModelItem {
       R_ABSTRACT(SI_RemoteItem, SI_ModelItem);
    public:
       R_ATTR_GET_IS(RBool, isRemote, rTrue);
       R_ATTR_RW(RBool, readOnly);
    Constructors:
       SI_RemoteItem(R_Base const &o);
       SI_RemoteItem(R_Symbol &nm, RValue const &dflt,
Service *prnt = 0)
```

2.3.5. SI_MemoryItem Class

The SI_MemoryItem class represents locations in a memory on a remote machine. As described in the background section, some remote machines may provide direct access to the remote machine memory.

```
class SI_MemoryItem: public SI_RemoteItem {
       R_CONCRETE(SI_MemoryItem, SI_RemoteItem);
    public:
    Attributes:
       R_FUNC_GET_IS(RCard, start, address( ));
                          starting address.
    Reading and Writing:
       virtual RBool updateChildrenNewValue(SI_AppItem *,
       RValue const &);
       virtual RBool updateChildrenCurrentValue (SI_AppItem
       *, RValue const &);
    Constructors:
       R_COPY_CONSTRUCTOR SI_MemoryItem(R_Base const &o);
       SI_MemoryItem  (R_Symbol &nm, RValue const &dflt,
                       RCard addr = 0, Service *prnt = 0);
       SI_MemoryItem  (R_Symbol &nm, RValue const &dflt,
                       RCard byteAddr, RCard bitAddr,
                       Service *prnt = 0).
```

2.3.6. SI_BitfieldItem Class

The SI_BitfieldItem class represents a bitfield within an SI_MemoryItem that contains it. The bit number is relative to the low-order bit of the containing memory item, which in turn may be up to 32 bits long. It is up to the default value's descriptor to specify the size (packedSize) of the bitfield.

```
class SI_BitfieldItem: public SI_MemoryItem {
       R_CONCRETE(SI_BitfieldItem, SI_RemoteItem);
    public:
       R_FUNC_GET(RCard, minSize);
       R_FUNC_GET(RCard, maxSize);
       R_FUNC_GET(RCard, packedSize);
          These have to be overridden in order
          to compute size correctly when
          itemSize is non-zero.
       virtual void readOrEnqueue(SI_AppItem *app, RBool
       mayQueue);
       virtual void writeOrEnqueue
              (SI_AppItem *app, RValue const &v,
              RBool mayQueue);
       virtual void readEnqueue(SI_AppItem *app);
       virtual void writeEnqueue
              (SI_AppItem *app, RValue const &v);
       virtual RBool updateParentNewValue
              (SI_AppItem *, RValue const &);
       virtual RBool updateParentCurrentValue
              (SI_AppItem *, RValue const &).
```

3. Communication Module

3.1. Overview

The communication module 180 works with the machine module 170 to perform operations and access data on a remote machine 90, in accordance with requests made by executing the "readRequest" and "newValueSet" operations on instances of class SI_AppItem. The objective of the communication module 170, located in the core layer 190 in FIG. 2, is to provide a programming interface for carrying out an interaction, called a "communication session," between the computer system 1 running the remote service application program (e.g. 100, 110, 120, 130 in the Application Layer 140 of FIG. 2) and some remote machine 10. The implementation of this programming interface is contained in subclasses of the basic communication classes, the subclasses being located in the interface layer 260 of FIG. 2.

A preferred embodiment of the present invention uses a single programming interface, defined in the communication module 170, for all kinds of remote machines. The subclasses in Interface Layer 260 provide implementations for that programming interface suitable for interacting with particular kinds of remote machines.

In a preferred embodiment of the present invention, the session class hierarchies consists of the following (note indentation denotes inheritance):

```
SI_DeviceCallBack
    SI_CommunicationSession
        SI_BufferedSession          buffered session
            SI_MemorySession        memory based session
                SI_256BytesSession      256bytes per call
                                        session
            SI_CopierSession        program based session
        SI_UnBufferedSession        unbuffered session
            SI_DBSession            data base session
                SI_CustAccessSession    customer data
                                        base access
            SI_HistorySession       history db
TI_TaskItem
    TI_CommunicationItem            communication task item
        TI_MemoryItem               memory based task item
        TI_ProgramItem              program based task
                                    item
        TI_HistoryItem              data base task item
```

3.2. Detailed Description

The SI_DeviceCallBack class contains a set of abstract programming interfaces for asynchronous communication between the remote service application and an external process, communication device, or remote machine. Since such an asynchronous input or output operation may require some time to complete, the application merely issues the request and continues to process user interface events. When the operation has been completed, the device driver will "call back" the application using the "connectDone" operation.

"SI_CommunicationSession" is the abstract base class for all sessions, i.e. interactions with remote machines. There are two subclasses of SI_CommunicationSession: buffered and unbuffered.

Buffered sessions (SI_BufferedSession and its subclasses) handle communications using a protocol that requires data to be transmitted and received in blocks, possibly including a header that contains protocol information. The data and header are then stored in a buffer prior to being sent, or after being received. The SI_BufferedSession contains the code required to move data between the buffer and the remote service application's internal data structures (contained in the application state 600, 810), using information in the machine model 630, 860 to specify the format of the data and its location within the buffer. SI_MemorySession, SI_256BytesSession, and SI_CopierSession are illustrative subclasses of SI_CommunicationSession which provide communication specific information for different remote machines.

Unbuffered sessions (SI_UnBufferedSession and its subclasses) are used as an interface to entities, such as database servers or file servers, for which an application programming interface is provided by some operating system or library, that supports direct data transfers between the remote machine and the data in the application state 600, 810, e.g. by remote procedure call. SI_DBSession, SI_CustAccessSession, and SI_HistorySession are illustrative subclasses of SI_UnBufferedSession which provide communication specific information for different remote databases, etc.

Figure 6:
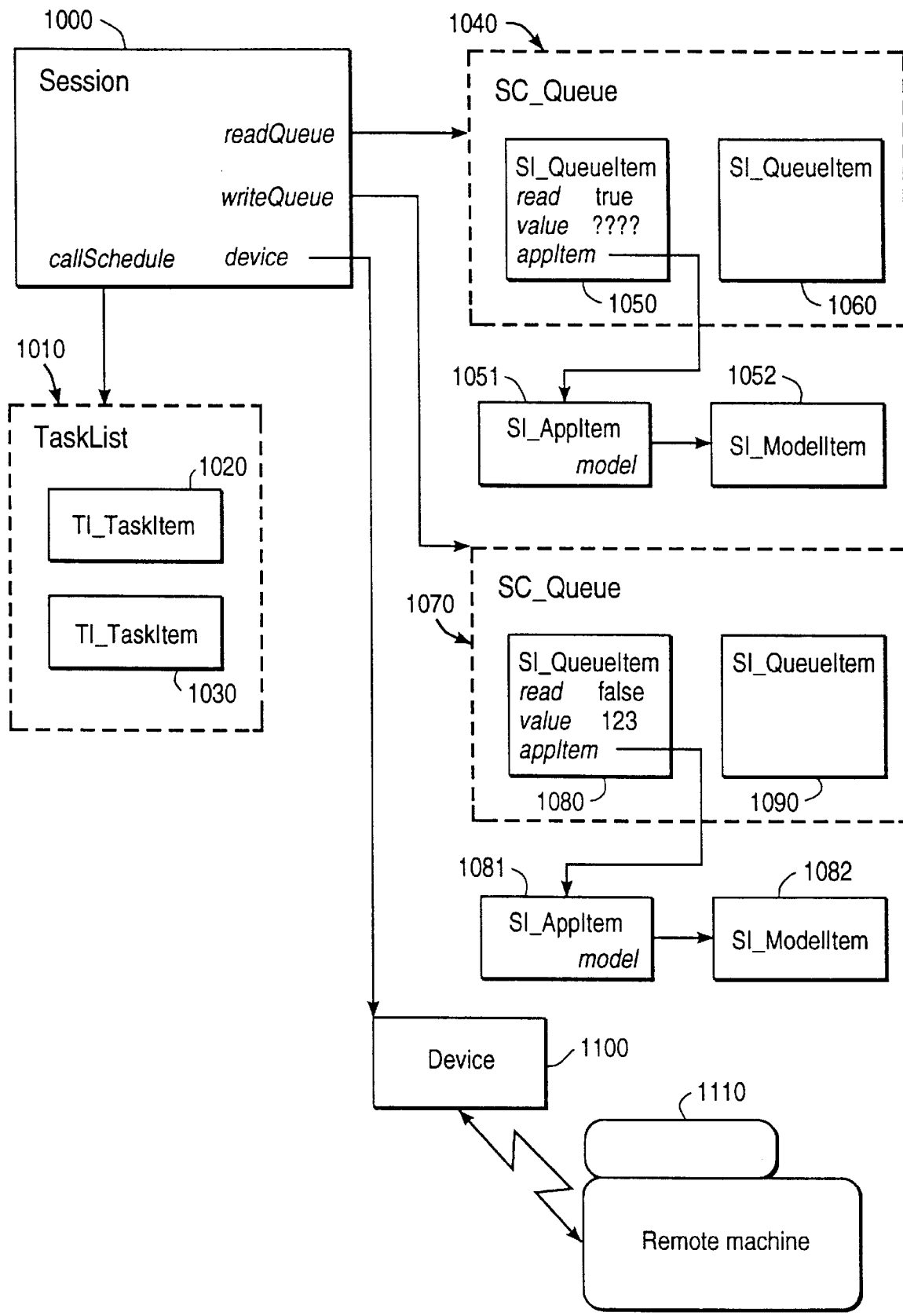
FIG. 6 illustrates the representation, in a preferred embodiment of the present invention, of the objects that are required in order to communicate with and operate upon a remote machine.

TI_TaskItems are used to break a communication session into a sequence of steps. FIG. 6 illustrates a typical session between a computer system 1 and a remote machine 90, 1110. A session 1000 contains a local read queue 1040 and a local write queue 1070, a virtual batching operation to execute requested operations on service items, and a virtual mapping operation to translate data between the external format used by the remote machine 90, 1110 and the computer system 1. The queues 1040 and 1070 are instances of SC_Queue, and contain instances 1050, 1060, 1080, 1090 of SI_QueueItem.

Each SI_QueueItem, e.g. 1050 or 1080, contains a Boolean attribute "read" which is true for read requests 1050 and false for write requests 1080, an Rvalue attribute "value" which is undefined for read requests 1050 and contains the value to be written for write requests 1080, and an attribute "appItem" containing a reference to the SI_AppItem 1051, 1081 that represents the remote service to be operated upon. The SI_AppItem 1051, 1081 in turn refers to an instance 1052, 1082 of a subclass of SI_ModelItem that describes the data type, size, and location of the service.

The session 1000 also has an attribute "callSchedule" that refers to a list 1010 of instances 1020, 1030 of some subclass of class TI_TaskItem. The subclass used is specific to the type of remote machine 1110 being communicated with. The call schedule list determines the order of operations to be done in a single call, and may be used for optimization, for example by re-ordering references to items 920, 930 in a remote facsimile machine's memory 910 in order to minimize the number of separate calls required to access them, in a facsimile machine that transfers a maximum 256 consecutive bytes per call.

When the session 1000 is initialized, it requests a device manager object for an instance 1100 of a subclass of CM_CommunicationDevice that provides an interface to the communication device 70 by which the application program can communicate with a remote machine 90, 1110. The request made by session 1000 includes a specification of the protocol to be used in communicating with the remote machine 90, 1110; the device manager returns an instance 1100 of a device 70 that can use the requested protocol and is not already in use.

When the remote service application requests that the queued-up communication requests be executed, typically in response to the user, the session 1000 iterates through its read queue 1040 and write queue 1070 to construct a callSchedule 1010. If necessary, it accumulates data to be written in a buffer using the virtual function "putValueIntoBuffer" of each corresponding SI_ModelItem 1082 to translate the data from its internal format in the SI_QueueItem 1080 to its external representation and store it in the buffer.

The session 1000 then iterates through the call schedule 1010 and tells each task item 1020, 1030 to perform its operation. Each task item 1020, 1030 in turn tells session 1000 what operation to perform on remote machine 1110. Session 1000 then uses the device controller 1100 (referred to above) to perform the low level read or write operation with remote machine 1110. If necessary, it then uses the virtual function "getValueFromBuffer" of each the corresponding SI_ModelItem 1052 to extract the data from the buffer, translate it from external to internal representation, and store it in the SI_AppItem 1051 using the SI_AppItem 1051's "currentValueSet" operation.

3.3. Defining New Session Types

As can be seen, the application programmer may readily define subclasses to the class SI_CommunicationSession in order to describe new ways of communicating with any new remote machine, database, or other external resource. Any application linked with a library containing the code for such a subclass will be able to make use of the new session type at runtime; such applications need not be recompiled, but only relinked. By putting the new classes in a dynamic link library (DLL), suitably-constructed applications can make use of new session types even after having been linked and distributed to users.

4. Communication Device Interface

4.1. Overview

A communication device 70, (device) is a computer system peripheral such as a modem, through which remote service applications communicate with a remote machine. In a preferred embodiment of the present invention, a communication device 70 is represented within an application program as an instance 1100 of a subclass of class CM_CommunicationDevice.

In a preferred embodiment of the present invention, the device class hierarchies consist of the following (note indentation denotes inheritance):

```
CM_CommunicationDevice
    CM_Modem modem
        CM_CCA          Communication adapter for a FAX
        CM_USACCA ...   adapter for 256-byte protocol
        CM_LADP         Line adapter/multiplexer
        CM_DBACESS      device for a database
CM_DeviceManager
```

4.2. Detailed Description

The class CM_CommunicationDevice encapsulates all attributes and operations relevant not only to physical communication devices such as modems, but also application programming interfaces to such things as databases and database servers. An instance of CM_CommunicationDevice has attributes that contain the communication address of a remote machine, a list of protocol restrictions specific for the remote machine, and virtual functions "initDevice," "connect," "read," "write," and "disconnect" which provide a generic programming interfaces for all devices.

The class CM_CCA is a preferred embodiment of a class that defines all attributes and operations that are applicable to communication controller adapters used to communicate with a remote facsimile machine. A CCA (Communication Control Adapter) is one embodiment of a special-purpose fax modem that can access the internal memory of the remote machine. The CM_USACCA class defines a preferred embodiment of how to access/modify a facsimile machine that uses a 256-byte protocol.

The class CM_LADP is a preferred embodiment of a class used for communication with copiers. This class uses an instance of CM_Modem as a communication channel. The LADP (Line Adapter) is one embodiment of a combination modem and multiplexer that interfaces between a telephone line and up to five copiers.

The class CM_DBACESS is a preferred embodiment of a class that allows the remote service application to view a database as if it were a remote device. This class has a handle to a database and uses operations defined by a database interface library to access and update data items in the database.

The class CM_DeviceManager is a preferred embodiment of class for a global object the function of which is to keep track of all of the communication devices 70 attached to a computer system 1, their status (idle or busy), and the protocols which they support. A communication session object 1000 requests a device object 1100 from the device manager, which returns a reference to a device 1100 that is currently idle and that is capable of handling the communication protocol required by remote machine 90, 1110.

4.3. Adding New Devices

As can be seen, the application programmer may readily define subclasses to the class CM_CommunicationDevice in order to define a protocol for any new remote device, database, or other external resource. Any application linked with a library containing the code for such a subclass will be able to make use of the new protocol at runtime; such applications need not be recompiled, but only relinked. By putting the new classes in a dynamic link library (DLL), suitably-constructed applications can make use of new protocols even after being linked and distributed to users.

Conclusion

In the foregoing specification, the invention has been described with reference to a specific exemplary embodiment thereof. Many changes, modifications, and additional extensions to the framework facilitating the modeling of remote devices are readily envisioned and are included within other embodiments of the present invention.

The specification and drawings are, accordingly, to be regarded in an illustrative rather than in a restrictive sense. It will, however, be evident that various modifications and changes may be made thereunto without departing from the broader spirit and scope of the invention as set forth in the claims.

What is claimed is:

1. An apparatus for communicating with a plurality of remote machines, of a plurality of machine types, the apparatus comprising:

a computer system including a processor and memory;

a data communication interface, coupled to the computer system and to the plurality of remote machines, for communicating with each of the plurality of remote machines;

a first plurality of software objects within the memory for describing services for the plurality of remote machines;

a plurality of operations within the memory associated with the first plurality of software objects, the plurality of operations for satisfying requests described by the services of the first plurality of software objects; and a second plurality of software objects within the memory, each of the second plurality of software objects identifying and describing an item in a database;

wherein the plurality of operations includes a database operation.

2. The apparatus of claim 1, wherein the plurality of operations includes operations on the plurality of remote machines.

3. The apparatus of claim 1, wherein the plurality of operations includes items of data to be transferred to the plurality of remote machines, including data types, data sizes, and data locations.

4. The apparatus of claim 1, further comprising a second plurality of software objects within the memory, each of the second plurality of software objects describing at least one application item for the plurality of remote machines.

5. The apparatus of claim 4, wherein the application items for the plurality of remote machines includes pointers to the first plurality of software objects and current values corresponding to values of data items stored within the memory of the plurality of remote machines.

6. The apparatus of claim 5, wherein the application items for the plurality of remote machines also includes read request flags and new values for describing pending requests for values to be transferred to the plurality of remote machines.

7. The apparatus of claim 1, wherein requests for updates to the database are created when items of data are transferred to the plurality of remote machines.

8. The apparatus of claim 1, further comprising a second plurality of software objects within a queue in the memory, the second plurality of software objects including requests for operations to be performed on the plurality of remote machines.

9. The apparatus of claim 1, further comprising a second plurality of software objects within a queue in the memory, the second plurality of software objects including requests for items of data to be transferred to the plurality of remote machines.

10. The apparatus of claim 1, further comprising:
   processing means for transforming the first plurality of software object into a data file; and
   a mass storage device, coupled to the processing means, for containing the data file.

11. The apparatus of claim 10, wherein the data file includes textual data.

12. The system of claim 1, wherein the database is a customer database.

13. The system of claim 12, wherein the second plurality of software objects allows a user to interactively specify a machine group of the plurality of remote machines with which to communicate.

14. The system of claim 1, wherein the database is a machine history database.

15. The system of claim 1, wherein:
   at least one of the plurality of remote machines includes memory for storing data; and
   the plurality of operations includes an operation to transfer machine parameter data between the memory of one of the remote machines and the memory within the computer system.

16. The system of 15, wherein the machine parameter data to be transferred is a remote machine's serial number.

17. The apparatus of claim 1, wherein the plurality of remote machines includes a database server.

18. An apparatus for communicating with a plurality of remote machines, of a plurality of machine types, the apparatus comprising:
   a computer system including a processor, memory and a mass storage device, the mass storage device for containing a plurality of data files, the plurality of data files including representations of software objects;
   a data communication interface, coupled to the computer system and to the plurality of remote machines, for communicating with each of the plurality of remote machines; and
   an application program within the memory for transforming one of the plurality of data files during run-time into a plurality of software objects within the memory for describing services for the plurality of remote machines.

19. The apparatus of claim 18, wherein the plurality of data filed includes textual data.

20. The apparatus of claim 18, further comprising;
   a display;
   a keyboard;
   a pointing device;
   a user interface;
   user interface objects within the memory that control the user interface, for making requests for services on the plurality of remote machines, in response to user input with the user interface;
   objects within the memory, coupled to the user interface, and for updating the user interface when a service has been performed on one of the plurality remote machines.

21. The apparatus of claim 20, wherein the services for the plurality of remote machines includes operations on the plurality of remote machines.

22. The apparatus of claim 20, wherein the services for the plurality of remote machines includes items of data to be transferred to the plurality of remote machines, including data types, data sizes, and data locations.

23. The apparatus of claim 20, wherein the user interface objects are configured to make requests for the services described by the plurality of software objects transformed from the one data file.

24. The system of claim 18, wherein the plurality of remote machines includes an office machine.

25. The system of claim 24, wherein the office machine is off-site.

26. The system of claim 18, wherein;
   at least one of the plurality of remote machines includes memory for storing data; and
   the plurality of operations includes an operation to transfer machine parameter data between the memory of one of the remote machines and the memory within the computer system.

27. The system of claim 26, wherein the machine parameter data to be transferred is a remote machine's serial machine.

28. The apparatus of claim 18, wherein the plurality of remote machines includes a database server.

29. A system for communicating with a plurality of remote machines of a plurality of machine types, the system comprising:
   a computer system including a memory and a mass storage device;
   a plurality of machine description files within the mass storage device, the plurality of machine description files for describing the plurality of remote machines, the plurality of machine description files including representations of software objects; and
   a plurality of application programs within the memory for communicating with the plurality of remote machines, the plurality of application programs adapted to read during runtime one of the plurality of machine description files that describes a particular remote machine if the application programs need to communicate with the particular remote machine to satisfy requests described by services of the plurality of software objects.

30. The system of claim 2, wherein the services of the plurality of software objects includes operations on the plurality of remote machines.

31. The system of claim 29, wherein the services of the plurality of software objects includes items of data to be transferred to the plurality of remote machines.

32. The system of claim 29, further comprising:
- a local database for accessing a remote database, the remote database containing the plurality of machine types and access information for the plurality of remote machines; and
- a program for querying the remote database and for constructing a data file including a representation of a plurality of software objects specifying a machine type and access information for one of the plurality of remote machines.

33. The system of claim 29, wherein the plurality of application programs further comprises:
- a program for operating on the plurality of remote machines using a queue in the memory, the queue including a plurality of software objects including requests for operations to be performed on the plurality of remote machines.

34. The system of claim 29, wherein the plurality of application programs further comprises a program for operating on the plurality of remote machines using a queue in the memory, the queue including a plurality of software objects including requests for items of data to be transferred to the plurality of remote machines.

35. The system of claim 29, wherein the plurality of application programs further comprises a program for receiving communications from the plurality of remote machines, and for outputting files containing the data communicated by the plurality of remote machines.

36. The system of claim 29, wherein the plurality of application programs further comprises a program for allowing a user to interactively specify one of the plurality of remote machines and services for the one remote machine.

37. The system of claim 36, wherein the services for the one remote machine includes operations for the one remote machine.

38. The system of claim 36, wherein the services for the one remote machine includes items of data to be transferred with the one remote machine.

39. The system of claim 29, wherein each of the plurality of application programs is adapted to transform one of the plurality of machine description files into software objects that describe services for the particular remote machine.

* * * * *